United States Patent
Zhang et al.

(10) Patent No.: US 10,736,013 B2
(45) Date of Patent: Aug. 4, 2020

(54) WIRELESS LOCAL AREA NETWORK CHANNEL MANAGEMENT METHOD IN RAIL TRANSPORT AND RELATED DEVICE

(71) Applicant: Huawei Technologies Co., Ltd., Shenzhen (CN)

(72) Inventors: Lin Zhang, Suzhou (CN); Wei Ruan, Shanghai (CN); Liyun Ou, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/201,039

(22) Filed: Nov. 27, 2018

(65) Prior Publication Data

US 2019/0098552 A1    Mar. 28, 2019

Related U.S. Application Data

(63) Continuation of application No. PCT/CN2017/085538, filed on May 23, 2017.

(30) Foreign Application Priority Data

May 27, 2016    (CN) .......................... 2016 1 0370134

(51) Int. Cl.
| | |
|---|---|
| *H04W 36/32* | (2009.01) |
| *H04W 84/00* | (2009.01) |
| *H04W 4/42* | (2018.01) |
| *H04W 72/04* | (2009.01) |
| *H04W 84/12* | (2009.01) |
| *H04W 88/08* | (2009.01) |

(52) U.S. Cl.
CPC ............. *H04W 36/32* (2013.01); *H04W 4/42* (2018.02); *H04W 72/04* (2013.01);
(Continued)

(58) Field of Classification Search
CPC ...................................................... H04W 36/32
See application file for complete search history.

(56) References Cited

U.S. PATENT DOCUMENTS

| | | | |
|---|---|---|---|
| 2012/0236749 A1 | 9/2012 | Marinier et al. | |
| 2017/0238226 A1* | 8/2017 | Marque-Pucheu | H04W 36/20 |
| | | | 370/331 |

FOREIGN PATENT DOCUMENTS

| | | |
|---|---|---|
| CN | 1778124 A | 5/2006 |
| CN | 102256336 A | 11/2011 |

(Continued)

OTHER PUBLICATIONS

Lannoo, B., et al., "Radio-over-Fiber-Based Solution to Provide Broadband Internet Access to Train Passengers," Topics in Optical Communications, IEEE Communications Magazine, Feb. 2007, 7 pages.

(Continued)

*Primary Examiner* — John D Blanton
(74) *Attorney, Agent, or Firm* — Conely Rose, P.C.

(57) ABSTRACT

A wireless local area network channel management method in rail transport and a related device, where the method includes changing, by a first trackside access point, an operating channel of the first trackside access point to a second channel when a wireless communication link has been established between the first trackside access point and an in-vehicle access point, and a first channel and the second channel are different, where the first channel is an operating channel of the first trackside access point before the operating channel of the first trackside access point is changed, and the second channel is an operating channel of a second trackside access point, and instructing, by the first trackside access point, the in-vehicle access point to change an operating channel of the in-vehicle access point to the second channel.

20 Claims, 4 Drawing Sheets

(52) U.S. Cl.
CPC .......... *H04W 84/005* (2013.01); *H04W 84/12* (2013.01); *H04W 88/08* (2013.01)

(56) References Cited

FOREIGN PATENT DOCUMENTS

| CN | 104661224 A | 5/2015 |
|---|---|---|
| CN | 105357766 A | 2/2016 |
| WO | 2015185733 A1 | 12/2015 |

OTHER PUBLICATIONS

Foreign Communication From a Counterpart Application, European Application No. 17802152.3, Extended European Search Report dated May 2, 2019, 10 pages.
Machine Translation and Abstract of Chinese Publication No. CN1778124, May 24, 2006, 48 pages.
Machine Translation and Abstract of Chinese Publication No. CN102256336, Nov. 23, 2011, 10 pages.
Machine Translation and Abstract of Chinese Publication No. CN104661224, May 27, 2015, 39 pages.
Machine Translation and Abstract of Chinese Publication No. CN105357766, Feb. 24, 2016, 13 pages.
Foreign Communication From a Counterpart Application, PCT Application No. PCT/CN2017/085538, English Translation of International Search Report dated Jul. 26, 2017, 3 pages.
Foreign Communication From a Counterpart Application, PCT Application No. PCT/CN2017/085538, English Translation of Written Opinion dated Jul. 26, 2017, 4 pages.

\* cited by examiner

WIRELESS LOCAL AREA NETWORK CHANNEL MANAGEMENT METHOD IN RAIL TRANSPORT AND RELATED DEVICE

CROSS-REFERENCE TO RELATED APPLICATIONS

This application is a continuation of International Patent Application No. PCT/CN2017/085538 filed on May 23, 2017, which claims priority to Chinese Patent Application No. 201610370134.1 filed on May 27, 2016. The disclosures of the aforementioned applications are hereby incorporated by reference in their entireties.

TECHNICAL FIELD

The present disclosure relates to the communications field, and in particular, to a wireless local area network (also referred to as WLAN) channel management method in rail transport and a related device.

BACKGROUND

To meet a passenger's requirement for accessing the Internet in a rail transport vehicle, a wireless local area network technology may be used to dispose a vehicle-ground communications system. An in-vehicle access point (also referred to as AP) is disposed in a vehicle, and multiple trackside access points are disposed along a track. A wireless communication link is established between an in-vehicle access point and a trackside access point (for example, a mesh link or a wireless distribution system (WDS) link). The wireless communication link may support wireless communication between the in-vehicle access point and the trackside access point. A device of a passenger in the vehicle may access a network using the in-vehicle access point and further using the trackside access point. The in-vehicle access point and all the trackside access points use a same channel. When the vehicle is running, the in-vehicle access point is handed over between the multiple trackside access points. In a process of vehicle running, the in-vehicle access point listens to a signal of the trackside access point. If the in-vehicle access point finds that signal strength of a trackside access point meets a preset threshold, the in-vehicle access point may establish a wireless communication link to the trackside access point. In a process of continuous vehicle running, the in-vehicle access point finds that the signal strength of the trackside access point to which the wireless communication link was originally established becomes weaker, and a signal of another trackside access point becomes stronger. When signal strength of the other trackside access point meets the preset threshold, the in-vehicle access point may disconnect the original wireless communication link and establish a new wireless communication link to the other trackside access point.

A trackside access point may be interfered with by a radar signal or another signal, and interference may be avoided if the trackside access point is switched to another channel. However, a channel that is used by the trackside access point after channel switching and a channel that is used by another trackside access point and the in-vehicle access point are different. Therefore, establishment of a wireless communication link is affected. If the trackside access point does not switch an operating channel of the trackside access point, interference affects establishment of a wireless communication link. Further, some local regulations stipulate that when an access point uses some channels as operating channels, if detecting a radar signal, the access point needs to switch the operating channel of the access point. Therefore, interference from the radar signal or the other signal affects in-vehicle access point handover between the multiple trackside access points.

SUMMARY

A wireless local area network channel management method in rail transport, a device, and a system are provided in order to ensure that channels between trackside access points are the same.

A first aspect provides a wireless local area network channel management method in rail transport, and the method includes that if a wireless communication link has been established between a first trackside access point and an in-vehicle access point, and a first channel and a second channel are different, changing, by the first trackside access point, an operating channel of the first trackside access point to the second channel, and instructing the in-vehicle access point to change an operating channel of the in-vehicle access point to the second channel, where the first channel is an operating channel of the first trackside access point before the operating channel of the first trackside access point is changed, and the second channel is an operating channel of a second trackside access point.

When the first channel and the second channel are different, the operating channel of the first trackside access point and an operating channel of a trackside access point are changed to the second channel. This can ensure that channels between trackside access points are the same such that handover efficiency can be improved when the in-vehicle access point is handed over between the trackside access points.

With reference to the first aspect, in a first implementation of the first aspect, the method further includes changing, by the first trackside access point, the operating channel of the first trackside access point to the first channel after the wireless communication link between the first trackside access point and the in-vehicle access point is disconnected.

When the wireless communication link between the first trackside access point and the in-vehicle access point is disconnected, the first trackside access point changes the operating channel of the first trackside access point to the first channel, that is, restores the operating channel to the original channel to prevent another trackside access point from changing the operating channel accordingly.

With reference to the first aspect or the first implementation of the first aspect, in a second implementation of the first aspect, before changing, by the first trackside access point, an operating channel of the first trackside access point to the second channel, the method further includes obtaining, by the first trackside access point, a driving direction of a vehicle that carries the in-vehicle access point, and querying, by the first trackside access point from a neighboring access point list, an identifier of the second trackside access point that is adjacent to the first trackside access point and that is associated with the driving direction of the vehicle, and the operating channel of the second trackside access point.

A second aspect provides a wireless local area network channel management method in rail transport, and the method includes determining, by a controller, that a first channel and a second channel are different, where the first channel is an operating channel of a first trackside access point, and the second channel is an operating channel of a second trackside access point, and instructing, by the controller, the first trackside access point to change the operating channel to the second channel, and instructing the first trackside access point to send an instruction message in order to instruct an in-vehicle access point to change an operating channel of the in-vehicle access point to the second channel.

When determining that the first channel and the second channel are different, the controller instructs to change the operating channels of the first trackside access point and the in-vehicle access point to the second channel. This can ensure that channels between trackside access points are the same such that handover efficiency can be improved when the in-vehicle access point is handed over between the trackside access points.

With reference to the second aspect, in a first implementation of the second aspect, the method further includes instructing, by the controller, the first trackside access point to change the operating channel of the first trackside access point to the first channel after a wireless communication link between the first trackside access point and the in-vehicle access point is disconnected.

After the wireless communication link between the first trackside access point and the in-vehicle access point is disconnected, the controller instructs the first trackside access point to restore the operating channel to the original first channel to prevent another trackside access point from changing an operating channel accordingly.

With reference to the second aspect or the first possible implementation of the second aspect, in a second possible implementation of the second aspect, before instructing, by the controller, the first trackside access point to change the operating channel to the second channel, the method further includes determining, by the controller, a trackside access point whose operating channel is different from a preset channel as the second trackside access point, and determining, by the controller, the first trackside access point according to a preset condition and a driving direction of a vehicle, where the preset condition includes any one of the first trackside access point is adjacent to the second trackside access point, a logical distance between the first trackside access point and the second trackside access point meets a preset threshold, or a physical distance between the first trackside access point and the second trackside access point meets a preset threshold.

With reference to the second aspect or the second possible implementation of the second aspect, in a third possible implementation of the second aspect, instructing, by the controller, the first trackside access point to change the operating channel to the second channel includes instructing, by the controller, the first trackside access point to change the operating channel to the second channel when the wireless communication link is established between the first trackside access point and the in-vehicle access point.

A third aspect provides a trackside access point, including a channel change unit configured to change an operating channel of the trackside access point to the second channel if a wireless communication link has been established between a trackside access point and an in-vehicle access point, and a first channel and a second channel are different, where the first channel is an operating channel of a first trackside access point before the operating channel of the first trackside access point is changed, and the second channel is an operating channel of another trackside access point, and an instruction unit configured to instruct the in-vehicle access point to change an operating channel of the in-vehicle access point to the second channel.

A fourth aspect provides a controller, including a determining unit configured to determine that a first channel and a second channel are different, where the first channel is an operating channel of a first trackside access point, and the second channel is an operating channel of a second trackside access point, and an instruction unit configured to instruct the first trackside access point to change the operating channel to the second channel, and instruct the first trackside access point to send an instruction message in order to instruct an in-vehicle access point to change an operating channel of the in-vehicle access point to the second channel.

A fifth aspect provides a trackside access point, where the trackside access point includes a processor and a communications interface, the communications interface is configured to establish a wireless communication link to an in-vehicle access point, and the processor is configured to, if a wireless communication link has been established between a first trackside access point and the in-vehicle access point, and a first channel and a second channel are different, change an operating channel of the first trackside access point to the second channel, and instruct, using the communications interface, the in-vehicle access point to change an operating channel of the in-vehicle access point to the second channel, where the first channel is an operating channel of the first trackside access point before the operating channel of the first trackside access point is changed, and the second channel is an operating channel of a second trackside access point.

A sixth aspect provides a controller, where the controller includes a processor and a communications interface, the communications interface is configured to connect to multiple trackside access points and perform signaling interaction, the processor is configured to determine that a first channel and a second channel are different, where the first channel is an operating channel of a first trackside access point, and the second channel is an operating channel of a second trackside access point, and the processor is configured to, using the communications interface, instruct the first trackside access point to change the operating channel to the second channel, and instruct the first trackside access point to send an instruction message in order to instruct an in-vehicle access point to change an operating channel of the in-vehicle access point to the second channel.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
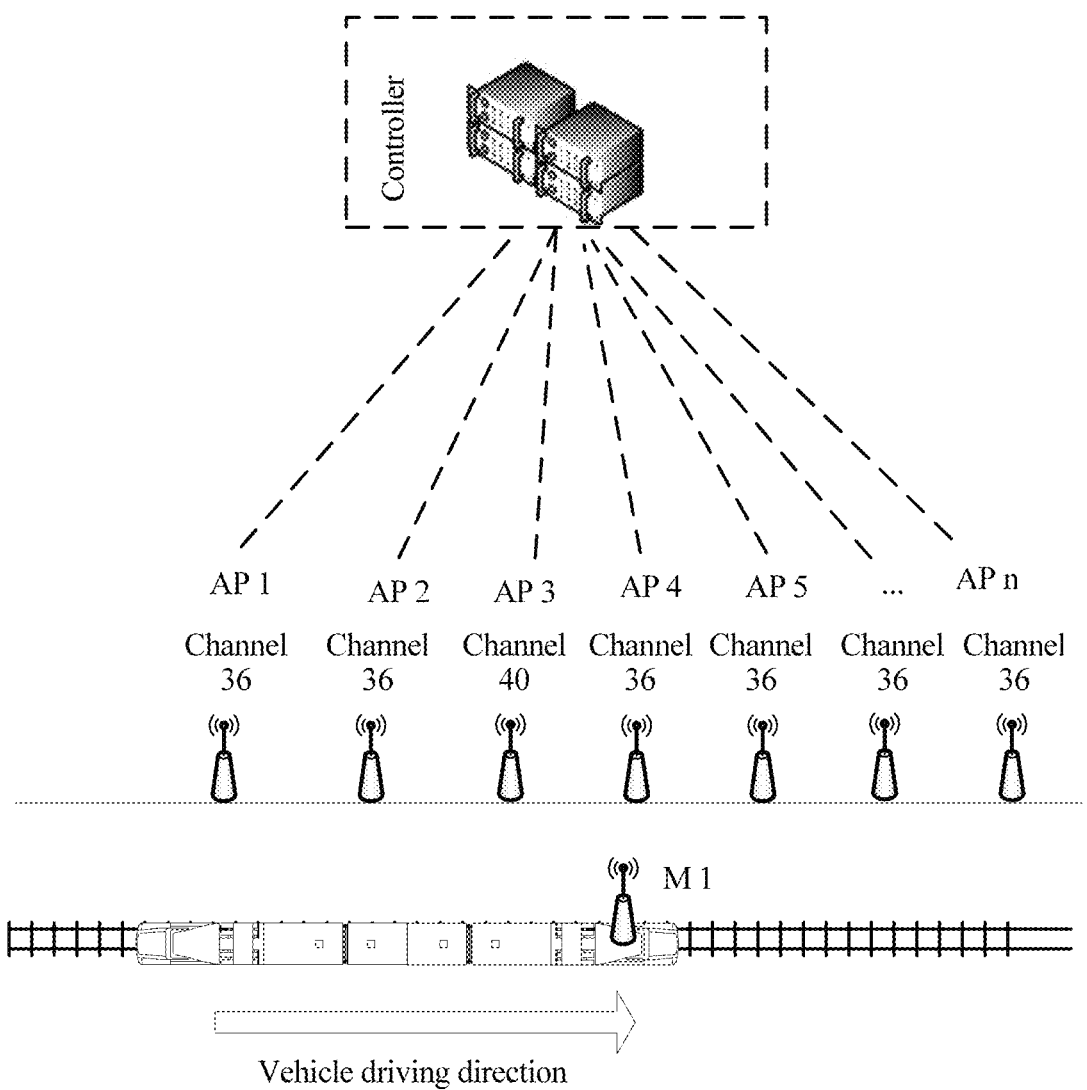
FIG. 1 is an architecture diagram of a wireless local area network channel management system in rail transport according to an embodiment of the present disclosure.

Referring to FIG. 1, FIG. 1 is an architecture diagram of a wireless local area network channel management system in rail transport according to an embodiment of the present disclosure. Rail transport refers to a transportation manner of running along a track, and includes a transportation manner that uses a wheeled vehicle running on the track to transport a passenger and goods such as railway transportation, a light rail, a tram, a subway, and a transportation manner that does not use a wheel form but still runs along the track, such as a magnetic levitation, a cable car, a cableway, or the like. In the rail transport, a vehicle running on the track is directionally guided. This embodiment of the present disclosure may be applied to rail transport in which a vehicle runs on a track, the vehicle may carry one or more in-vehicle access points, and multiple trackside access points are placed along the track. Optionally, a channel management system may further include a controller, and the controller may be a server or a network device, or may be a control center that includes multiple devices. The controller is configured to manage a trackside access point. The controller may be connected to the multiple trackside access points using a wired network, a wireless network, or a hybrid network of the wired and wireless networks. For example, the multiple trackside access points may be connected to the controller using a switch and a router. For another example, the controller may be directly connected to each trackside access point. The controller may be further connected to an in-vehicle access point using the trackside access point.

As shown in FIG. 1, a trackside access point is deployed at a specific distance on ground of a track side, for example, a trackside access point AP 1, a trackside access point AP 2, a trackside access point AP 3, a trackside access point AP 4, . . . , and a trackside access point AP n. An in-vehicle access point M 1 deployed in a train establishes a wireless communication link to the trackside access point. For example, the in-vehicle access point M 1 receives and sends data using a wireless communication link to the trackside access point AP 2. A driving direction of a vehicle that carries the in-vehicle access point M 1 is driving from the trackside access point AP 2 to the trackside access point AP 3. It is assumed that due to interference from a radar signal, a current operating channel of the trackside access point AP 3 is switched from an original channel 36 to a channel 40, and operating channels of other trackside access points are the channel 36. When finding that a signal of the trackside access point AP 2 becomes weaker, the in-vehicle access point M 1 first scans the channel 36 to attempt to establish a wireless communication link to another trackside access point. However, an operating channel of the trackside access point AP 3 is the channel 40, and the in-vehicle access point M 1 cannot find the trackside access point AP 3. The in-vehicle access point M 1 continually attempts to scan another channel until the trackside access point AP 3 is found. This process takes a relatively long time. Therefore, it is difficult to quickly establish a new wireless communication link.

To improve handover efficiency of the in-vehicle access point M 1 between trackside access points, this application provides a wireless local area network channel management method in rail transport. For details, refer to a subsequent embodiment.

Figure 2:
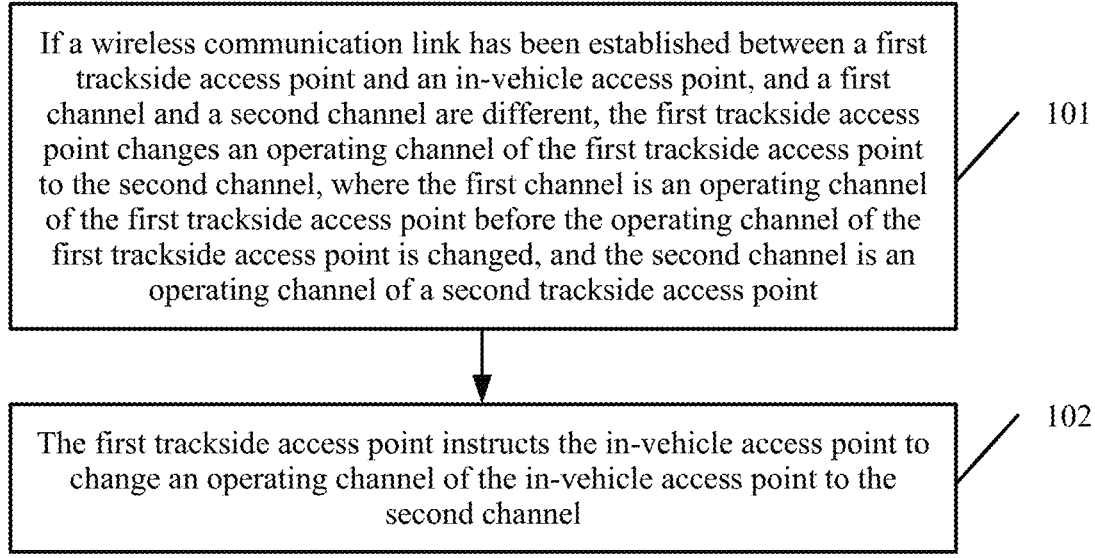
FIG. 2 is a schematic flowchart of a wireless local area network channel management method in rail transport according to an embodiment of the present disclosure.

Referring to FIG. 1 and FIG. 2, FIG. 2 is a schematic flowchart of a wireless local area network channel management method in rail transport according to an embodiment of the present disclosure. In this embodiment of the present disclosure, channel switching may be initiated by a first trackside access point, or channel switching may be initiated under instruction of a controller, or channel switching may be initiated jointly by a first trackside access point and a controller. The method includes step 101 and step 102.

Step 101. If a wireless communication link has been established between a first trackside access point and an in-vehicle access point, and a first channel and a second channel are different, the first trackside access point changes an operating channel of the first trackside access point to the second channel, where the first channel is an operating channel of the first trackside access point before the operating channel of the first trackside access point is changed, and the second channel is an operating channel of a second trackside access point.

Step 102. The first trackside access point instructs the in-vehicle access point to change an operating channel of the in-vehicle access point to the second channel.

In a process of vehicle driving, an in-vehicle access point may establish a wireless communication link to a trackside access point that is disposed along a track such that a device of a passenger in a vehicle may access a network using the in-vehicle access point and the trackside access point. The foregoing wireless communication link may be a wireless mesh link, or may be a WDS link. Originally, operating channels of all trackside access points are a same channel. Due to interference from a radar or another factor, some trackside access points perform channel switching. If a trackside access point that is interfered with by the radar or the other factor is instructed by a controller to switch a channel, the controller may also instruct another appropriate trackside access point to switch a channel. If a trackside access point that is interfered with by the radar or the other factor autonomously determines to switch a channel, a trackside access point that has performed channel switching may send a switched operating channel to a neighboring trackside access point, or send a switched operating channel to a controller, and the controller instructs another appropriate trackside access point to switch a channel.

The in-vehicle access point is handed over from the first trackside access point to the second trackside access point. When the first trackside access point and the second trackside access point have a same operating channel, the in-vehicle access point may directly perform handover. When the first trackside access point and the second trackside access point have different operating channels, the in-vehicle access point does not know the operating channel of the second trackside access point. Therefore, during handover, the in-vehicle access point needs to perform scanning to obtain the operating channel of the second trackside access point, and then can change a channel and be handed over from the first trackside access point to the second trackside access point. To improve handover efficiency between trackside access points, a channel of the first trackside access point and a channel of the second trackside access point may first be uniform, and then handover is performed. Because the first trackside access point has learned the operating channel of the second trackside access point, that is, the second channel, the first trackside access point may send a channel switch announcement (CSA) to the in-vehicle access point, and the in-vehicle access point may change the operating channel to the second channel according to the CSA.

If the trackside access point autonomously determines to switch the channel, optionally, the first trackside access point receives a channel change message sent by the second trackside access point or the controller, and changes the operating channel of the second trackside access point in the neighboring access point list according to the channel change message.

For example, the first trackside access point is a trackside access point AP 2 in FIG. 1, and the second trackside access point is a trackside access point AP 3 in FIG. 1. The first trackside access point AP 2 stores a neighboring access point list, and the list records an operating channel of a neighboring access point, for example, an operating channel of a trackside access point AP 1 is a channel 36, and an operating channel of the second trackside access point AP 3 is the channel 36. If the operating channel of the second trackside access point AP 3 is switched from the channel 36 to a channel 40 due to interference from a radar, the first trackside access point AP 2 receives a channel change message, and changes the operating channel of the second trackside access point AP 3 in the neighboring access point list from the original channel 36 to the channel 40 according to the channel change message.

Optionally, the first trackside access point obtains a driving direction of a vehicle that carries the in-vehicle access point.

The first trackside access point queries, from the neighboring access point list, an identifier of the second trackside access point that is adjacent to the first trackside access point and that is associated with the driving direction of the vehicle, and the operating channel of the second trackside access point.

The first trackside access point may obtain the driving direction of the vehicle that carries the in-vehicle access point in any one of the following manners. In a first manner, when the wireless communication link is established between the first trackside access point and the in-vehicle access point, the in-vehicle access point actively sends driving direction information of the vehicle to the first trackside access point. In a second manner, when or after the wireless communication link is established between the first trackside access point and the in-vehicle access point, the first trackside access point sends a direction obtaining request to the in-vehicle access point, the in-vehicle access point sends, to the first trackside access point according to the request, a direction response message that carries direction information, and the first trackside access point may obtain the driving direction of the vehicle using the response message. This embodiment of the present disclosure is not limited to the two above-described manners of obtaining the driving direction of the vehicle, or may be another manner, for example, the trackside access point obtains the driving direction of the vehicle by means of technical measurement.

The neighboring access point list may include a driving direction of a vehicle, an identifier of a neighboring trackside access point corresponding to the driving direction, for example, a Media Access Control (MAC) address, and an operating channel of the neighboring trackside access point. For example, the first trackside access point is the trackside access point AP 2, and a driving direction of a vehicle obtained by the trackside access point AP 2 is from the trackside access point AP 1 to a trackside access point AP n.

The trackside access point AP 2 queries the neighboring access point list and learns that an identifier of a neighboring trackside access point corresponding to a direction from the trackside access point AP 1 to the trackside access point AP n is a MAC address of the trackside access point AP 3, and may further learn that an operating channel of the trackside access point AP 3 is the channel 40.

The first trackside access point AP 2 compares an operating channel of the first trackside access point AP 2, that is, the first channel, with an operating channel of the second neighboring trackside access point AP 3, that is, the second channel, to determine whether the first channel and the second channel are the same. If the first channel is the channel 36 and the second channel is the channel 40, the first trackside access point AP 2 learns that the first channel and the second channel are different.

If the trackside access point is instructed by the controller to switch a channel, the trackside access point does not need to record information about a neighboring trackside access point. After determining that an operating channel of the first trackside access point and an operating channel of the second neighboring trackside access point are different, the controller instructs the first trackside access point to switch to the second channel at an appropriate moment.

An operating channel of the first trackside access point and an operating channel of the in-vehicle access point may be synchronously switched to a channel that is the same as an operating channel of the second trackside access point.

To enable the in-vehicle access point to be quickly handed over from the first trackside access point to the second trackside access point, the channel switching manner needs to be used to ensure that the in-vehicle access point and the second trackside access point have a same channel before a connection is established. Because the wireless communication link has been established between the in-vehicle access point and the first trackside access point, if the operating channel of the in-vehicle access point is directly switched to the channel that is the same as the operating channel of the second trackside access point, the original wireless communication link between the in-vehicle access point and the first trackside access point may be directly disconnected. However, currently, the in-vehicle access point still cannot establish a new wireless communication link to the second trackside access point. This may cause signal interruption. Therefore, to ensure smooth handover when the first channel and the second channel are different, the operating channel of the first trackside access point and the operating channel of the in-vehicle access point may be synchronously switched to the channel that is the same as the operating channel of the second trackside access point in order to effectively reduce a packet loss probability.

If the trackside access point autonomously determines to switch a channel, there may be two manners of changing an operating channel. In a first manner, the first trackside access point performs channel changing. The first trackside access point may directly change an operating channel of the first trackside access point to the second channel, and send a channel change instruction such as a CSA message to the second trackside access point using a wireless communication link such that the in-vehicle access point changes an operating channel of the in-vehicle access point to the second channel. If the CSA message carries a switching time, when the switching time is reached, the first trackside access point and the in-vehicle access point may perform channel changing. In a second manner, the controller provides an instruction. The first trackside access point may send a channel change request to the controller, and the controller receives the channel change request and determines whether channel change is needed. If the channel change is needed, the controller may send a channel change instruction to the first trackside access point to instruct the first trackside access point to change an operating channel of the first trackside access point to the second channel, and instruct the in-vehicle access point to change an operating channel of the in-vehicle access point to the second channel.

The foregoing process ensures that the first trackside access point, the second trackside access point, and the in-vehicle access point are located in a same channel. In this embodiment of the present disclosure, the in-vehicle access point may be handed over from the first trackside access point to the second trackside access point in a process of vehicle driving using the following steps. Specific steps are as follows.

Step 1. In a process of vehicle driving, the in-vehicle access point finds the second trackside access point, and detects that a signal of the second trackside access point is available. The in-vehicle access point establishes a new unactivated backup wireless communication link to the second trackside access point, simultaneously maintains an original wireless communication link to the first trackside access point, and may use the wireless communication link to receive and send data.

Step 2. When detecting that the signal of the second trackside access point is better than a signal of the first trackside access point, the in-vehicle access point may activate the backup wireless communication link to receive and send data, and still maintain the original wireless communication link at this moment. The original wireless communication link is used by the in-vehicle access point only to receive a cache packet sent by the first trackside access point, and cannot be used by the in-vehicle access point to send data to the first trackside access point.

Step 3. When the in-vehicle access point detects that the signal of the first trackside access point has been weakened to a particular threshold and is difficult to use, the in-vehicle access point entirely disconnects the original wireless communication link from the first trackside access point. In this case, the in-vehicle access point has entirely established a wireless communication link to the second trackside access point.

A process in which the in-vehicle access point is handed over from the first trackside access point to the second trackside access point may be not limited to the above-described process, or may be a process in which after establishing a new wireless communication link to the second trackside access point, the in-vehicle access point immediately disconnects the original wireless communication link from the first trackside access point.

Optionally, after the wireless communication link between the first trackside access point and the in-vehicle access point is disconnected, the first trackside access point changes the operating channel of the first trackside access point to the first channel.

After the in-vehicle access point establishes the new wireless communication link and disconnects the original wireless communication link, the operating channel of the first trackside access point is still the second channel. If the operating channel of the first trackside access point is not restored to the original first channel, some other trackside access points may change operating channels accordingly. For example, an operating channel of the first trackside access point AP 2 is the channel 36, and an operating channel of the second trackside access point AP 3 is the channel 40. If the first trackside access point AP 2 switches the operating channel to the channel 40, if the operating channel of the first trackside access point AP 2 is not restored after the new wireless communication link is established and the original wireless communication link is disconnected, when a channel of a trackside access point AP 1 that is accessed by a next vehicle is the channel 36, the operating channel of the trackside access point AP 1 needs to be changed to the channel 40 according to the operating channel of the first trackside access point AP 2. As a result, operating channels of multiple trackside access points may be changed to the channel 40. Consequently, a change made by one trackside access point causes changes made by the multiple trackside access points. After disconnecting from the in-vehicle access point, the first trackside access point restores the operating channel of the first trackside access point. This may reduce total times of channel switching in an entire system. A restoration process may be performed after disconnecting the original wireless communication link, and the first trackside access point immediately restores the operating channel of the first trackside access point. Alternatively, after a preset threshold time is reached, the first trackside access point then restores the operating channel of the first trackside access point.

In the foregoing embodiment of the present disclosure, when the wireless communication link is established between the first trackside access point and the in-vehicle access point, and the first channel and the second channel are different, a status may be determined, which is not limited to the first trackside access point, or may be monitored and determined by the controller.

In this embodiment of the present disclosure, when the wireless communication link has been established between the first trackside access point and the in-vehicle access point, and the operating channel of the first trackside access point and the operating channel of the second trackside access point are different, the first trackside access point changes the operating channel of the first trackside access point and the operating channel of the in-vehicle access point to the operating channel of the second trackside access point. Changing the channel ensures that the first trackside access point, the in-vehicle access point, and the second trackside access point have a same channel. In this way, when the in-vehicle access point needs to be handed over from the first trackside access point to the second trackside access point, there is no need to scan the operating channel of the second trackside access point. This reduces a time to obtain the operating channel of the second trackside access point, also simultaneously avoids a packet loss problem that is caused by the channel change in a handover process, and may improve handover efficiency between trackside access points.

Figure 3:
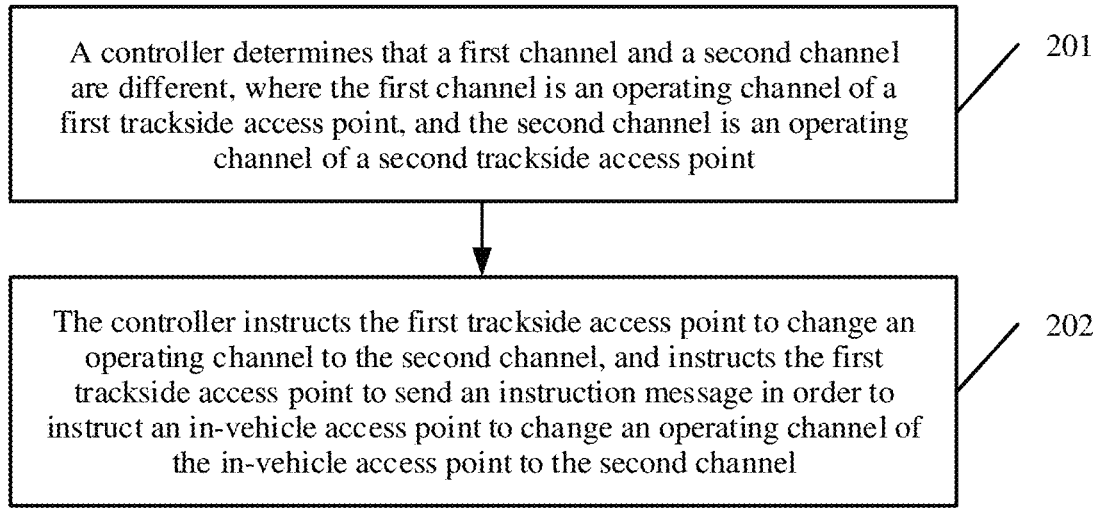
FIG. 3 is a schematic flowchart of another wireless local area network channel management method in rail transport according to an embodiment of the present disclosure.

Referring to FIG. 3, FIG. 3 is a schematic flowchart of another wireless local area network channel management method in rail transport according to an embodiment of the present disclosure. This embodiment of the present disclosure includes a procedure in which a controller is used to perform channel management on a trackside access point in an embodiment corresponding to FIG. 2. The method includes step 201 and step 202.

Step 201. A controller determines that a first channel and a second channel are different, where the first channel is an operating channel of a first trackside access point, and the second channel is an operating channel of a second trackside access point.

In a process of vehicle driving, an in-vehicle access point may establish a wireless communication link to a trackside access point that is disposed along a track such that a device of a passenger in a vehicle may access a network using the in-vehicle access point and the trackside access point. The foregoing wireless communication link may be a mesh link, or may be a WDS link. The controller may establish a communication connection to multiple trackside access points in a wired, a wireless or a combination of wired and wireless manners. The controller may monitor link establishment statuses between the multiple trackside access points and the in-vehicle access point in real time, and may further learn operating channels of the multiple trackside access points. It is assumed that originally, current channels of all trackside access points are a same channel. Due to interference from a radar or another factor, operating channels of some trackside access points are switched to another channel. These trackside access points may notify the controller that the trackside access points are interfered with by the radar or the other factor, and the controller instructs these trackside access points to switch the operating channels. When multiple consecutively disposed trackside access points are interfered with by a same interfering source (for example, the radar), the controller may instruct these trackside access points to switch to a new same operating channel in order to reduce times of channel switching that needs to be performed when the in-vehicle access point is handed over between these consecutively disposed trackside access points. The trackside access point may also autonomously determine to switch a channel. In this case, the trackside access point may send channel switching information to the controller. The controller modifies, according to the received channel switching information, channel information stored by the controller. The controller may also detect each trackside access point. If finding a trackside access point that performs channel changing, the controller may modify channel information corresponding to the trackside access point.

In this embodiment of the present disclosure, the controller determines a trackside access point whose operating channel is different from a preset channel as the second trackside access point. The second trackside access point may be one trackside access point, or may be multiple trackside access points. This embodiment of the present disclosure uses one trackside access point as an example, and the same rule applies to a case in which another trackside access point that performs the channel changing is used as the second trackside access point.

Optionally, the controller determines the first trackside access point according to a preset condition and a driving direction of a vehicle, where the preset condition includes any one of the first trackside access point is adjacent to the second trackside access point, a logical distance between the first trackside access point and the second trackside access point meets a preset threshold, or a physical distance between the first trackside access point and the second trackside access point meets a preset threshold.

The controller may obtain, in multiple manners, the driving direction of the vehicle that carries the in-vehicle access point, for example, the trackside access point that establishes the wireless communication link to the in-vehicle access point sends a direction obtaining request to the in-vehicle access point to obtain the driving direction of the vehicle, and notifies the controller. For another example, when establishing a wireless communication link to any trackside access point, the in-vehicle access point notifies the trackside access point of the driving direction of the vehicle. The controller obtains the driving direction of the vehicle using the trackside access point. This embodiment of the present disclosure is not limited to the above-described manners of obtaining the driving direction of the vehicle, or may be another manner, for example, the trackside access point or the controller obtains the driving direction of the vehicle by means of technical measurement.

The controller selects the first trackside access point according to the second trackside access point, the preset selection condition, and the driving direction of the vehicle, and the preset selection condition may be set and adjusted according to a reference factor such as a physical distance, a logical distance, a vehicle driving speed, and a terrain. When detecting that the vehicle driving speed is excessively high, the controller may adjust the preset selection condition, for example, increase the physical distance to provide a longer time for the in-vehicle access point to perform channel switching.

If the foregoing preset condition for determining the first trackside access point is a first type of condition, that is, the first trackside access point is adjacent to the second trackside access point, two or more trackside access points that are adjacent to the second trackside access point may be selected according to the foregoing condition, and further one trackside access point is selected as the first trackside access point from the two or more trackside access points according to the driving direction of the vehicle. For example, as shown in FIG. 1, the second trackside access point is a trackside access point AP 3, and the driving direction of the vehicle is from AP 1 to AP n. Then, from two trackside access points that are adjacent to the second trackside access point, a trackside access point AP 2 and a trackside access point AP 4, further, the AP 2 is selected as the first trackside access point according to the driving direction of the vehicle.

If the foregoing preset condition for determining the first trackside access point is a second type of condition, that is, a logical distance between the first trackside access point and the second trackside access point meets a preset threshold, or a third type of condition, that is, a physical distance between the first trackside access point and the second trackside access point meets a preset threshold, the first trackside access point may not be adjacent to the second trackside access point. If the first trackside access point is not a trackside access point that is adjacent to the second trackside access point, all trackside access points between the first trackside access point and the second trackside access point also need to switch to the second channel together with the first trackside access point. All the trackside access points between the first trackside access point and the second trackside access point may be referred to as transition trackside access points. For example, the second trackside access point is the trackside access point AP 3, the first trackside access point is determined as a trackside access point AP 1 according to the second type of condition and the driving direction of the vehicle, and then, a transition trackside access point is the trackside access point AP 2.

Step 202. The controller instructs the first trackside access point to change the operating channel to the second channel, and instructs the first trackside access point to send an instruction message in order to instruct the in-vehicle access point to change an operating channel of the in-vehicle access point to the second channel.

The first type of condition is used to determine the first trackside access point. When the wireless communication link is established between the in-vehicle access point and the first trackside access point, the controller may instruct the first trackside access point to switch the operating channel. For example, the second trackside access point is the trackside access point AP 3, and the first trackside access point is the trackside access point AP 2. When the controller finds that the wireless communication link has been established between the first trackside access point AP 2 and the in-vehicle access point, the controller may send a channel change instruction message to the first trackside access point AP 2. The channel change instruction message may instruct the first trackside access point AP 2 to change the operating channel to the second channel. Further, the channel change instruction sent by the controller may further instruct the first trackside access point AP 2 to send a CSA. The foregoing manner is also applicable to a first trackside access point that is determined by the second type of condition or the third type of condition.

The second type of condition or the third type of condition is used to determine the first trackside access point. When the in-vehicle access point is far away from the second trackside access point, the controller may instruct multiple trackside access points in front of the second trackside access point to switch operating channels together. Because the vehicle driving speed is high, when these trackside access points switch the operating channels, the in-vehicle access point may have left the first trackside access point. During operating channel switching, regardless of a trackside access point that is located between the first trackside access point and the second trackside access point and with which the in-vehicle access point communicates the trackside access point may instruct the in-vehicle access point and these trackside access points to switch operating channels together.

For example, the second trackside access point is the trackside access point AP 3, and the first trackside access point is the trackside access point AP 1. When the controller finds that the wireless communication link has been established between the first trackside access point AP 1 and the in-vehicle access point, the controller may send a channel change instruction message to the first trackside access point AP 1 and a transition trackside access point AP 2. The channel change instruction message instructs the first trackside access point AP 1 and the transition trackside access point AP 2 to change operating channels to the second channel. Further, the channel change instruction sent by the controller may further instruct the first trackside access point AP 1 and the transition trackside access point AP 2 to send CSAs, and the CSAs instruct the in-vehicle access point to change an operating channel to the second channel.

The channel change instruction sent by the controller may carry a switching time, and the first trackside access point and the transition trackside access point may determine, according to the switching time, a specific moment for channel switching in order to ensure that the first trackside access point, the transition trackside access point, and the in-vehicle access point synchronously perform operating channel switching.

Optionally, after the wireless communication link between the first trackside access point and the in-vehicle access point is disconnected, the controller instructs the first trackside access point to change the operating channel of the first trackside access point to the first channel.

If there is a transition trackside access point, the controller may instruct the first trackside access point and the transition trackside access point to restore operating channels to the original operating channel. A channel restoration process may be performed simultaneously or separately. For example, the first trackside access point and the transition trackside access point may separately perform operating channel restoration within a preset time range after a wireless communication link to the in-vehicle access point is disconnected, or after a wireless communication link between the in-vehicle access point and a last transition trackside access point is disconnected, the controller instructs the first trackside access point and the transition trackside access point to simultaneously perform operating channel restoration within a preset time range.

Optionally, the controller may also instruct a prepared trackside access point to switch an operating channel to the second channel. The prepared trackside access point is one or more trackside access points that are directed by a driving direction after a vehicle leaves the second trackside access point. If multiple consecutive trackside access points are interfered with by a same interfering source, and therefore are instructed to switch a new same operating channel, the prepared trackside access point is one or more trackside access points that are directed by the driving direction of the vehicle after the vehicle leaves a last trackside access point in these consecutive trackside access points. The controller may instruct the first trackside access point to switch the operating channel, and simultaneously instruct the prepared trackside access point to switch the operating channel. The controller may also instruct the prepared trackside access point to switch the operating channel when the in-vehicle access point arrives at a trackside access point whose operating channel is different from a preset channel. After instructing the first trackside access point to switch the operating channel, the controller may instruct the prepared trackside access point to switch the operating channel at any moment before the in-vehicle access point leaves the trackside access point whose operating channel is different from the preset channel. When a wireless communication link is established between the in-vehicle access point and the prepared trackside access point, or after a wireless communication link is established between the in-vehicle access point and the prepared trackside access point and before the wireless communication link is disconnected between the in-vehicle access point and the prepared trackside access point, the controller instructs the prepared trackside access point to change the operating channel to the first channel, and instructs the prepared trackside access point to send an instruction message in order to instruct the in-vehicle access point to change the operating channel of the in-vehicle access point to the first channel.

In this embodiment of the present disclosure, when determining that the first channel and the second channel are different, the controller instructs to change the operating channel of the first trackside access point and the operating channel of the in-vehicle access point to the second channel. This can ensure that the first trackside access point, the in-vehicle access point, and the second trackside access point have a same channel. In this way, when the in-vehicle access point needs to be handed over from the first trackside access point to the second trackside access point, the in-vehicle access point does not need to scan the operating channel of the second trackside access point, or obtain the operating channel of the second trackside access point using the controller. This reduces a time to obtain the operating channel of the second trackside access point, simultaneously avoids a packet loss problem that is caused by the channel change in a switching process, and may improve handover efficiency between trackside access points.

Figure 4:
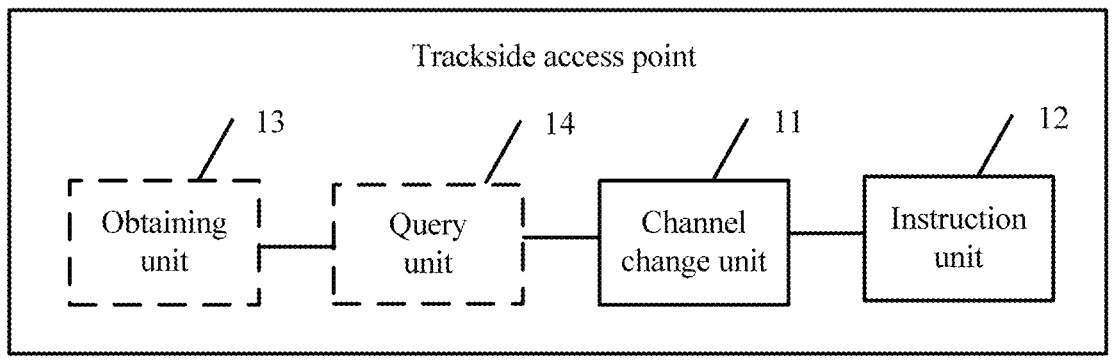
FIG. 4 is a schematic modular diagram of a trackside access point according to an embodiment of the present disclosure.

Referring to FIG. 4, FIG. 4 is a schematic modular diagram of a trackside access point according to an embodiment of the present disclosure. As shown in FIG. 4, the trackside access point may include a channel change unit 11 and an instruction unit 12.

The channel change unit 11 is configured to change an operating channel of the trackside access point to the second channel if a wireless communication link has been established between a trackside access point and an in-vehicle access point, and a first channel and a second channel are different, where the first channel is an operating channel of the trackside access point before the operating channel of the trackside access point is changed, and the second channel is an operating channel of another trackside access point.

The instruction unit 12 is configured to instruct the in-vehicle access point to change an operating channel of the in-vehicle access point to the second channel.

Optionally, the channel change unit 11 is further configured to change the operating channel of the trackside access point to the first channel after the wireless communication link between the trackside access point and the in-vehicle access point is disconnected.

Optionally, the trackside access point further includes an obtaining unit 13 and a query unit 14.

The obtaining unit 13 is configured to obtain a driving direction of a vehicle that carries the in-vehicle access point.

The query unit 14 is configured to query, from a neighboring access point list, an identifier of the other trackside access point that is adjacent to the trackside access point and that is associated with the driving direction of the vehicle, and the operating channel of the other trackside access point.

For detailed description of each unit in this embodiment of the present disclosure, refer to the foregoing method embodiments, and details are not described herein again.

Figure 5:
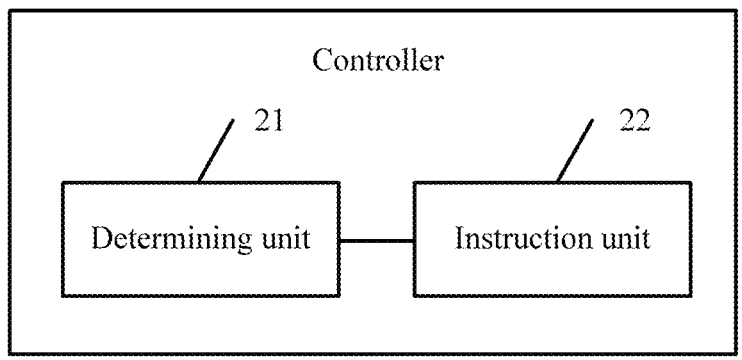
FIG. 5 is a schematic modular diagram of a controller according to an embodiment of the present disclosure.

Referring to FIG. 5, FIG. 5 is a schematic modular diagram of a controller according to an embodiment of the present disclosure. As shown in FIG. 5, the controller may include a determining unit 21 and an instruction unit 22.

The determining unit 21 is configured to determine that a first channel and a second channel are different, where the first channel is an operating channel of a first trackside access point, and the second channel is an operating channel of a second trackside access point.

The instruction unit 22 is configured to instruct the first trackside access point to change the operating channel to the second channel, and instruct the first trackside access point to send an instruction message in order to instruct the in-vehicle access point to change an operating channel of the in-vehicle access point to the second channel.

Optionally, the instruction unit 22 is further configured to instruct the first trackside access point to change the operating channel of the first trackside access point to the first channel after a wireless communication link between the first trackside access point and the in-vehicle access point is disconnected.

Optionally, the determining unit 21 is further configured to determine a trackside access point whose operating channel is different from a preset channel as the second trackside access point, and determine the first trackside access point according to a preset condition and a driving direction of a vehicle, where the preset condition includes any one of the first trackside access point is adjacent to the second trackside access point, a logical distance between the first trackside access point and the second trackside access point meets a preset threshold, or a physical distance between the first trackside access point and the second trackside access point meets a preset threshold.

Optionally, the instruction unit 22 is further configured to instruct the first trackside access point to change the operating channel to the second channel when the wireless communication link is established between the first trackside access point and the in-vehicle access point.

For detailed description of each unit in this embodiment of the present disclosure, refer to the foregoing method embodiments, and details are not described herein again.

Figure 6:
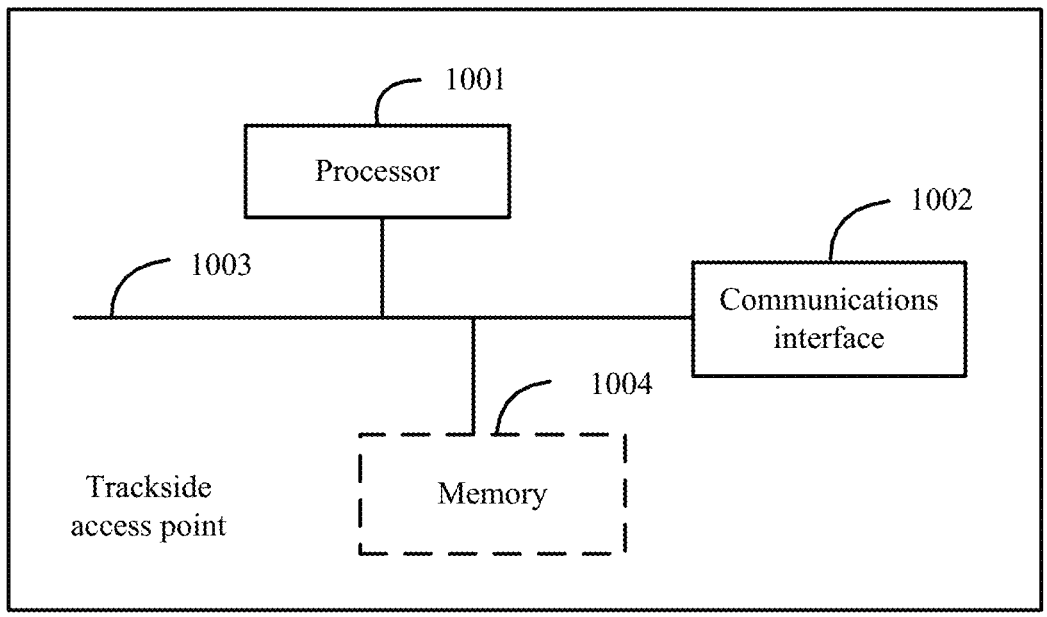
FIG. 6 is a schematic structural diagram of a trackside access point according to an embodiment of the present disclosure.

Referring to FIG. 6, FIG. 6 is a schematic structural diagram of a trackside access point according to an embodiment of the present disclosure. As shown in FIG. 6, the trackside access point includes a processor 1001 and a communications interface 1002, and the processor 1001 is connected to the communications interface 1002, for example, using a bus 1003. The processor 1001 may be a central processing unit (CPU). The communications interface 1002 may be a wireless communications interface, or a combination of a wireless communications interface and a wired communications interface. The wireless communications interface, for example, may be a wireless local area network interface. The wireless communications interface may further include a cellular mobile network interface or another type of wireless interface. The wired communications interface, for example, may be an Ethernet interface. The Ethernet interface may be an optical interface, an electrical interface, or a combination thereof. The wired communications interface and/or the wireless communications interface in the communications interface 1002 may be connected to a controller. The wireless communications interface in the communications interface 1002 may be configured to perform WLAN communication with an in-vehicle access point.

The trackside access point may further include a memory 1004. The memory 1004 may include a volatile memory, such as a random-access memory (RAM), or the memory may include a non-volatile memory, such as a read-only memory (ROM), a flash memory, a hard disk drive (HDD), or a solid state drive (SSD), or the memory 1004 may include a combination of the foregoing types of memories. The memory 1004 may be configured to store a neighboring access point list, and may further store a temporarily obtained related parameter (for example, a driving direction of a vehicle, and a speed). If the processor 1001 includes a CPU, the memory 1004 may further store program code, and transmit the program code to the CPU such that the CPU implements this embodiment of the present disclosure according to an instruction of the program code.

The processor 1001 is configured to, if a wireless communication link has been established between a trackside access point and an in-vehicle access point, and a first channel and a second channel are different, change an operating channel of the trackside access point to the second channel, where the first channel is an operating channel of the trackside access point before the operating channel of the trackside access point is changed, and the second channel is an operating channel of another trackside access point.

The processor 1001 is further configured to instruct the in-vehicle access point to change the operating channel of the in-vehicle access point to the second channel.

Optionally, the processor 1001 is further configured to change the operating channel of the trackside access point to the first channel after the wireless communication link between the trackside access point and the in-vehicle access point is disconnected.

Optionally, before performing a step of changing the operating channel of the trackside access point to the second channel, the processor 1001 is further configured to obtain a driving direction of a vehicle that carries the in-vehicle access point, and query, from a neighboring access point list, an identifier of the other trackside access point that is adjacent to the trackside access point and that is associated with the driving direction of the vehicle, and the operating channel of the other trackside access point.

For specific description of steps performed in the foregoing embodiment of the present disclosure, refer to descriptions of the foregoing method embodiments, and details are not described herein again.

Figure 7:
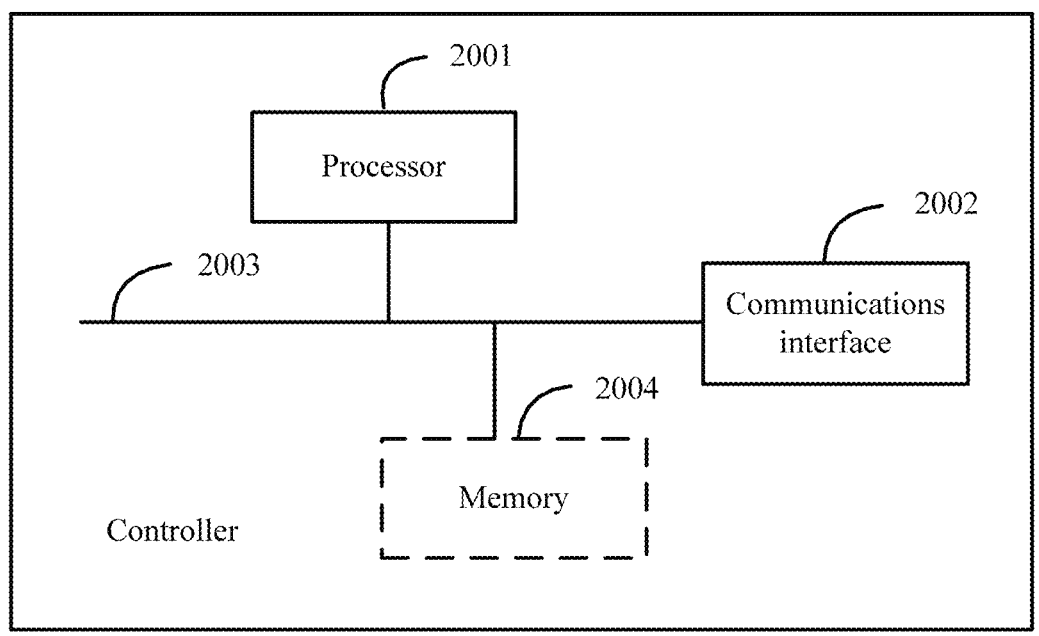
FIG. 7 is a schematic structural diagram of a controller according to an embodiment of the present disclosure.

Referring to FIG. 7, FIG. 7 is a schematic structural diagram of a controller according to an embodiment of the present disclosure. As shown in FIG. 7, the controller may be a controller, or may be a server, a network device, an access controller, or may be a control center that includes multiple devices. The controller may include a processor 2001 and a communications interface 2002, and the processor 2001 is connected to the communications interface 2002, for example, using a bus 2003. The processor 2001 may be a CPU. The communications interface 2002 may be a wired communications interface, a wireless communications interface, or a combination thereof. The wired communications interface, for example, may be an Ethernet interface. The Ethernet interface may be an optical interface, an electrical interface, or a combination thereof. The wireless communications interface, for example, may be a WLAN interface, a cellular mobile network interface, or the like. The communications interface 2002 may be configured to connect to multiple trackside access points and perform signaling interaction.

The controller may further include a memory 2004. The memory 2004 may include a volatile memory, such as a RAM, or the memory 2004 may include a non-volatile memory, such as a ROM, a flash memory, an HDD or an SSD, or the memory 2004 may include a combination of the foregoing types of memories. The memory 2004 may be configured to store an access point list, and may further store related data that is temporarily obtained by the controller, for example, a driving direction of a vehicle. If the processor 2001 includes a CPU, the memory 2004 may further store program code, and transmit the program code to the CPU such that the CPU implements this embodiment of the present disclosure according to an instruction of the program code.

The processor 2001 is configured to determine that a first channel and a second channel are different, where the first channel is an operating channel of a first trackside access point, and the second channel is an operating channel of a second trackside access point.

The processor 2001 is further configured to instruct the first trackside access point to change the operating channel to the second channel, and instruct, using the communications interface, the first trackside access point to send an instruction message in order to instruct the in-vehicle access point to change an operating channel of the in-vehicle access point to the second channel.

Optionally, the processor 2001 is further configured to instruct, using the communications interface 2002, the first trackside access point to change the operating channel of the first trackside access point to the first channel after a wireless communication link between the first trackside access point and the in-vehicle access point is disconnected.

Optionally, before performing a step of instructing the first trackside access point to change the operating channel to the second channel, the processor 2001 is further configured to determine a trackside access point whose operating channel is different from a preset channel as the second trackside access point, and determine the first trackside access point according to a preset condition and a driving direction of a vehicle, where the preset condition includes any one of the first trackside access point is adjacent to the second trackside access point, a logical distance between the first trackside access point and the second trackside access point meets a preset threshold, or a physical distance between the first trackside access point and the second trackside access point meets a preset threshold.

Optionally, that the processor 2001 instructs the first trackside access point to change the operating channel to the second channel includes that when the wireless communication link is established between the first trackside access point and the in-vehicle access point, the controller instructs the first trackside access point to change the operating channel to the second channel.

For specific description of steps performed in the foregoing embodiment of the present disclosure, refer to descriptions of the foregoing method embodiments, and details are not described herein again.

A person of ordinary skill in the art may understand that all or some of the steps of the method embodiments may be completed by a program instructing a processor. The program may be stored in a computer readable storage medium. The storage medium may include a RAM, a ROM, a flash memory, an HDD, an SSD, a magnetic tape, a FLOPPY DISK, an optical disc, or any combination thereof.

The foregoing descriptions are merely example implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A wireless local area network channel management method in rail transport, comprising:
    changing, by a first trackside access point, an operating channel of the first trackside access point from a first channel to a second channel;
    instructing, by the first trackside access point, an in-vehicle access point to change an operating channel of the in-vehicle access point to the second channel when a wireless communication link has been established between the first trackside access point and the in-vehicle access point and when the first channel and the second channel are different, wherein the first channel is the operating channel of the first trackside access point before the operating channel of the first trackside access point is changed, and wherein the second channel is an operating channel of a second trackside access point; and
    changing, by the first trackside access point, the operating channel of the first trackside access point to the first channel after the first trackside access point and the in-vehicle access point are decoupled.

2. The wireless local area network channel management method of claim 1, wherein before changing the operating channel of the first trackside access point to the second channel, the wireless local area network channel management method further comprises:
    obtaining, by the first trackside access point, a driving direction of a vehicle carrying the in-vehicle access point; and
    querying, by the first trackside access point from a neighboring access point list, an identifier of the second trackside access point adjacent to the first trackside access point associated with the driving direction of the vehicle and the operating channel of the second trackside access point.

3. The wireless local area network channel management method of claim 1, wherein the wireless communication link is a WI-FI communication link.

4. A wireless local area network channel management method in rail transport, comprising:
   determining, by a controller, that a first channel and a second channel are different, wherein the first channel is an operating channel of a first trackside access point, and wherein the second channel is an operating channel of a second trackside access point;
   instructing, by the controller, the first trackside access point to change the operating channel to the second channel;
   instructing, by the controller, the first trackside access point to send an instruction message to instruct an in-vehicle access point to change an operating channel of the in-vehicle access point to the second channel; and
   instructing, by the controller, the first trackside access point to change the operating channel of the first trackside access point to the first channel after the first trackside access point and the in-vehicle access point are decoupled.

5. The wireless local area network channel management method of claim 4, wherein before instructing the first trackside access point to change the operating channel to the second channel, the wireless local area network channel management method further comprises:
   determining, by the controller, a trackside access point whose operating channel is different from a preset channel as the second trackside access point; and
   selecting, by the controller, the first trackside access point according to a preset condition and a driving direction of a vehicle.

6. The wireless local area network channel management method of claim 5, wherein the preset condition comprises that the first trackside access point is adjacent to the second trackside access point.

7. The wireless local area network channel management method of claim 5, wherein the preset condition comprises that a logical distance between the first trackside access point and the second trackside access point meets a preset threshold.

8. The wireless local area network channel management method of claim 5, wherein the preset condition comprises that a physical distance between the first trackside access point and the second trackside access point meets a preset threshold.

9. The wireless local area network channel management method of claim 4, wherein instructing the first trackside access point to change the operating channel to the second channel comprises instructing, by the controller, the first trackside access point to change the operating channel to the second channel when a wireless communication link is established between the first trackside access point and the in-vehicle access point.

10. The wireless local area network channel management method of claim 4, wherein the first channel and the second channel are WI-FI communication links.

11. A trackside access point, comprising:
    a communications interface configured to establish a wireless communication link to an in-vehicle access point; and
    a processor coupled to the communications interface and configured to:
        change an operating channel of the trackside access point from a first channel to a second channel;
        instruct, using the communications interface, the in-vehicle access point to change an operating channel of the in-vehicle access point to the second channel when the wireless communication link has been established between the trackside access point and the in-vehicle access point and when the first channel and the second channel are different, wherein the first channel is the operating channel of the trackside access point before the operating channel of the trackside access point is changed, and wherein the second channel is an operating channel of a second trackside access point; and
        change the operating channel of the trackside access point to the first channel after the trackside access point and the in-vehicle access point are decoupled.

12. The trackside access point of claim 11, wherein before changing the operating channel of the trackside access point to the second channel, the processor is further configured to:
    obtain a driving direction of a vehicle carrying the in-vehicle access point; and
    query, from a neighboring access point list, an identifier of the second trackside access point adjacent to the trackside access point associated with the driving direction of the vehicle and the operating channel of the second trackside access point.

13. The trackside access point of claim 11, wherein the wireless communication link is a WI-FI communication link.

14. A controller, comprising:
    a communications interface configured to:
        couple to a plurality of trackside access points; and
        perform signaling interaction; and
    a processor coupled to the communications interface and configured to:
        determine that a first channel and a second channel are different, wherein the first channel is an operating channel of a first trackside access point, and wherein the second channel is an operating channel of a second trackside access point;
        instruct, using the communications interface, the first trackside access point to change the operating channel to the second channel;
        instruct, using the communications interface, the first trackside access point to send an instruction message to instruct an in-vehicle access point to change an operating channel of the in-vehicle access point to the second channel; and
        instruct, using the communications interface, the first trackside access point to change the operating channel of the first trackside access point to the first channel after the first trackside access point and the in-vehicle access point are disconnected.

15. The controller of claim 14, wherein before instructing the first trackside access point to change the operating channel to the second channel, the processor is further configured to:
    determine a trackside access point whose operating channel is different from a preset channel as the second trackside access point; and
    select the first trackside access point according to a preset condition and a driving direction of a vehicle.

16. The controller of claim 15, wherein the preset condition comprises that the first trackside access point is adjacent to the second trackside access point.

17. The controller of claim 15, wherein the preset condition comprises that a logical distance between the first trackside access point and the second trackside access point meets a preset threshold.

18. The controller of claim 15, wherein the preset condition comprises that a physical distance between the first trackside access point and the second trackside access point meets a preset threshold.

19. The controller of claim 14, wherein the processor is further configured to instruct the first trackside access point to change the operating channel to the second channel when a wireless communication link is established between the first trackside access point and the in-vehicle access point.

20. The controller of claim 14, wherein the first channel and the second channel are WI-FI communication links.

* * * * *